(12) United States Patent
Oguma et al.

(10) Patent No.: US 10,592,179 B2
(45) Date of Patent: Mar. 17, 2020

(54) INFORMATION PROCESSING APPARATUS, INFORMATION PROCESSING SYSTEM AND INFORMATION PROCESSING METHOD FOR EXECUTING DOCUMENT READING PROCESSING

(71) Applicant: KYOCERA Document Solutions Inc., Osaka (JP)

(72) Inventors: Takashi Oguma, Osaka (JP); Toru Yasui, Osaka (JP); Manuel Manalo, Osaka (JP); Chikara Yuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 106 days.

(21) Appl. No.: 15/827,546

(22) Filed: Nov. 30, 2017

(65) Prior Publication Data

US 2018/0150266 A1 May 31, 2018

(30) Foreign Application Priority Data

Nov. 30, 2016 (JP) .................................. 2016-233054

(51) Int. Cl.
*G06F 9/46* (2006.01)
*G06F 3/12* (2006.01)
*H04L 12/24* (2006.01)
*G03G 15/00* (2006.01)

(52) U.S. Cl.
CPC ......... *G06F 3/126* (2013.01); *G03G 15/5075* (2013.01); *G03G 15/5083* (2013.01); *G06F 3/1226* (2013.01); *G06F 3/1229* (2013.01); *G06F 3/1273* (2013.01); *G06F 3/1285* (2013.01); *H04L 41/5006* (2013.01); *H04L 41/5009* (2013.01)

(58) Field of Classification Search
None
See application file for complete search history.

(56) References Cited

U.S. PATENT DOCUMENTS

| 2008/0163233 A1* | 7/2008 | Kobayashi | G06F 9/5083 718/104 |
| 2008/0320482 A1* | 12/2008 | Dawson | G06F 9/5027 718/104 |
| 2016/0274832 A1* | 9/2016 | Nishida | G06F 3/1219 |

FOREIGN PATENT DOCUMENTS

JP 2012-126024 A 7/2012

* cited by examiner

*Primary Examiner* — Kenneth Tang
(74) *Attorney, Agent, or Firm* — Hawaii Patent Services; Nathaniel K. Fedde; Kenton N. Fedde

(57) ABSTRACT

Provided is an information processing apparatus that is capable of changing the processing performance for each customer and executing a series of tasks related to reading of a document. A service-level-information-acquiring unit acquires service-level information from an image forming apparatus. A processing-capacity-changing unit changes the degree of processing capacity by its own apparatus in accordance with the service-level information. The processing-capacity-changing unit also changes the degree of processing capacity by changing a number of allocated execution units of a task-executing unit within a specified time.

5 Claims, 8 Drawing Sheets

INFORMATION PROCESSING APPARATUS, INFORMATION PROCESSING SYSTEM AND INFORMATION PROCESSING METHOD FOR EXECUTING DOCUMENT READING PROCESSING

INCORPORATION BY REFERENCE

This application is based on and claims the benefit of priority from Japanese Patent Application No. 2016-233054 filed on Nov. 30, 2016, the contents of which are hereby incorporated by reference.

BACKGROUND

The present disclosure relates to an information processing apparatus, an information processing system and an information processing method, and more particularly, relates to an information processing apparatus, an information processing system and an information processing method for executing a document reading process.

Conventionally, there are image forming apparatuses such as multifunctional peripherals (MFP) and the like that are capable of printing text and images.

In typical technology, there are image forming apparatuses (printing job processing apparatuses) that have a printing job input method for inputting a printing job that includes page data for a plurality of pages and printing settings, and a computing method that, when allocated printing is set in the inputted printing settings, processes the plurality of pages that are to be allocated to paper in parallel. The typical technology is able to suppress a decrease in printing speed due to an increase in the number of pages to be printed on paper.

SUMMARY

The information processing apparatus according to the present disclosure is an image processing apparatus that is capable of transmitting and receiving data to and from a document reading apparatus, and includes a service-level-information-acquiring unit and a processing-capacity-changing unit. The service-level-information-acquiring unit acquires service-level information that indicates a level of service for a service that executes a series of tasks for data of a document that is read by the document reading apparatus by an own apparatus. The processing-capacity-changing unit changes a degree of processing capacity by the own apparatus in correspondence with the service-level information that is acquired by the service-level-information-acquiring unit. The processing-capacity-changing unit changes the degree of the processing capacity by changing a number of allocated execution units of a task-executing unit that executes the tasks within a specified time.

The information processing system according to the present disclosure is an information processing system that includes a document reading apparatus and an information processing apparatus that is capable of transmitting and receiving data to and from the document reading apparatus. The document reading apparatus includes a service-level-information-transmitting unit. The service-level-information-transmitting unit transmits service-level information that indicates a level of service for service that causes a series of tasks for data of a document that is read by the document reading apparatus to be executed by the information processing apparatus. The information processing apparatus includes a service-level-information-acquiring unit and a process-capacity-changing unit. The service-level-information-acquiring unit acquires the service-level information from the document reading apparatus. The process-capacity-changing unit changes the degree of processing capacity by the own apparatus in accordance with the service-level information that is acquired by the service-level-information-acquiring unit. The processing-capacity-changing unit changes the degree of the processing capacity by changing a number of allocated execution units of a task-executing unit that executes the tasks within a specified time.

The information processing method according to the present disclosure is an information processing method that is executed by an information processing apparatus that is capable of transmitting and receiving data to and from a document reading apparatus. The information processing method causes the information processing apparatus to acquire service-level information that indicates a level of service for a service that executes a series of tasks for data of a document that is read by the document reading apparatus by an own apparatus. The information processing method also causes the information processing apparatus to change the degree of processing capacity by the own apparatus in accordance with the acquired service-level information. The information processing method also causes the information processing apparatus to change the degree of the processing capacity by changing a number of allocated execution units of a task-executing unit that executes the tasks within a specified time.

DETAILED DESCRIPTION

Embodiments

[System Configuration of an Information Processing System X]

Figure 1:
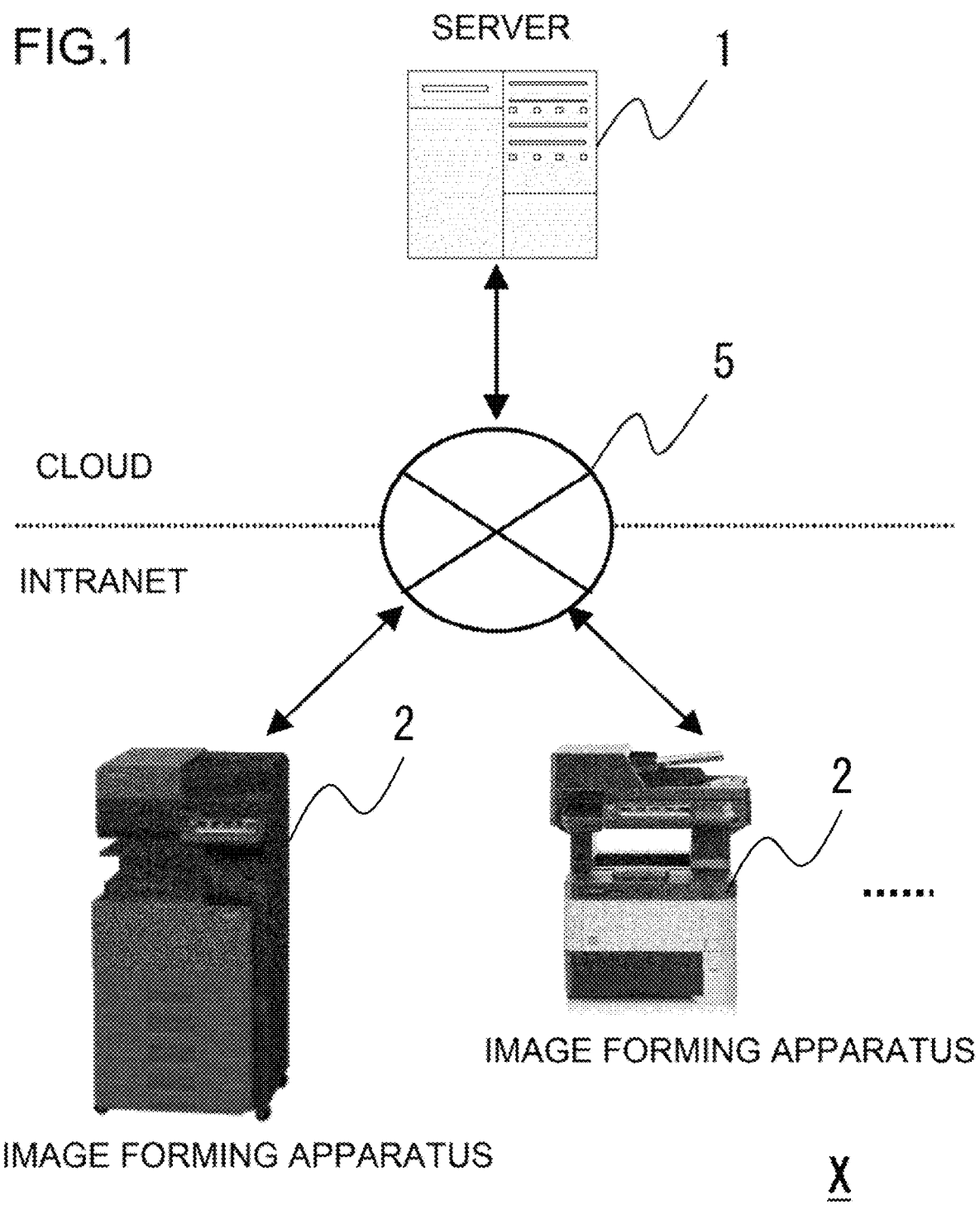
FIG. 1 is a system configuration diagram of an information processing system of an embodiment of an image forming apparatus according to the present disclosure.

First, the system configuration of an information processing system X will be explained with reference to FIG. 1 to FIG. 3.

The information processing system X of an embodiment according to the present disclosure is configured so that a server 1 and image forming apparatuses 2 are connected by a network 5.

The server 1 is an information processing apparatus that is capable of transmitting and receiving various kinds of data to and from an image forming apparatus 2. In this embodiment, the server 1 is configured by a general-purpose apparatus, a PC (Personal Computer) or the like, and mainly integrates the functions of reading (capturing) documents (text, documents) in image forming apparatuses 2 in an intranet network 5 or the like explained below. More specifically, the server 1 mainly performs various processing on image data of a document that is captured from an image forming apparatus 2. Even more specifically, the server 1 follows the flow of processing that is set as a workflow that is explained later, and for example, is able to perform image processing, OCR (Optical Character Recognition) processing, classification processing and the like, and finally is able to perform transmission processing for e-mail, shared folders (document boxes, folder for saving files), transmission to a DMS (Document Management System) for business and the office use and the like.

An image forming apparatus 2 is a document reading apparatus such as an MFP, a network scanner, a document scanner, a network FAX, a printer with a scanner function, and the like. An image forming apparatus 2 may execute application software (hereafter, simply referred to as an "application") for connecting to the server 1.

The network 5 in this embodiment includes an intranet that is configured by an LAN (Local Area Network), dedicated line or the like that is capable of transmitting and receiving various kinds of data at high speed, a so-called "cloud" network such as a WAN (Wide Area Network) like the Internet (registered trademark), portable telephone network and the like.

In this embodiment, an example is explained in which the side to which an image forming apparatus 2 of the network 5 is connected is the intranet side, and the side to which the server 1 is connected is the cloud side. In other words, an image forming apparatus 2 can connect to the server 1 via a router, gateway or the like using a specified port or protocol. Moreover, in the network 5 of this embodiment, a global address may be set for the Internet side, and a private address may be set for the local side. Furthermore, in the network 5 of this embodiment, the intranet side and the cloud side may be separated by a firewall or the like.

Figure 2:
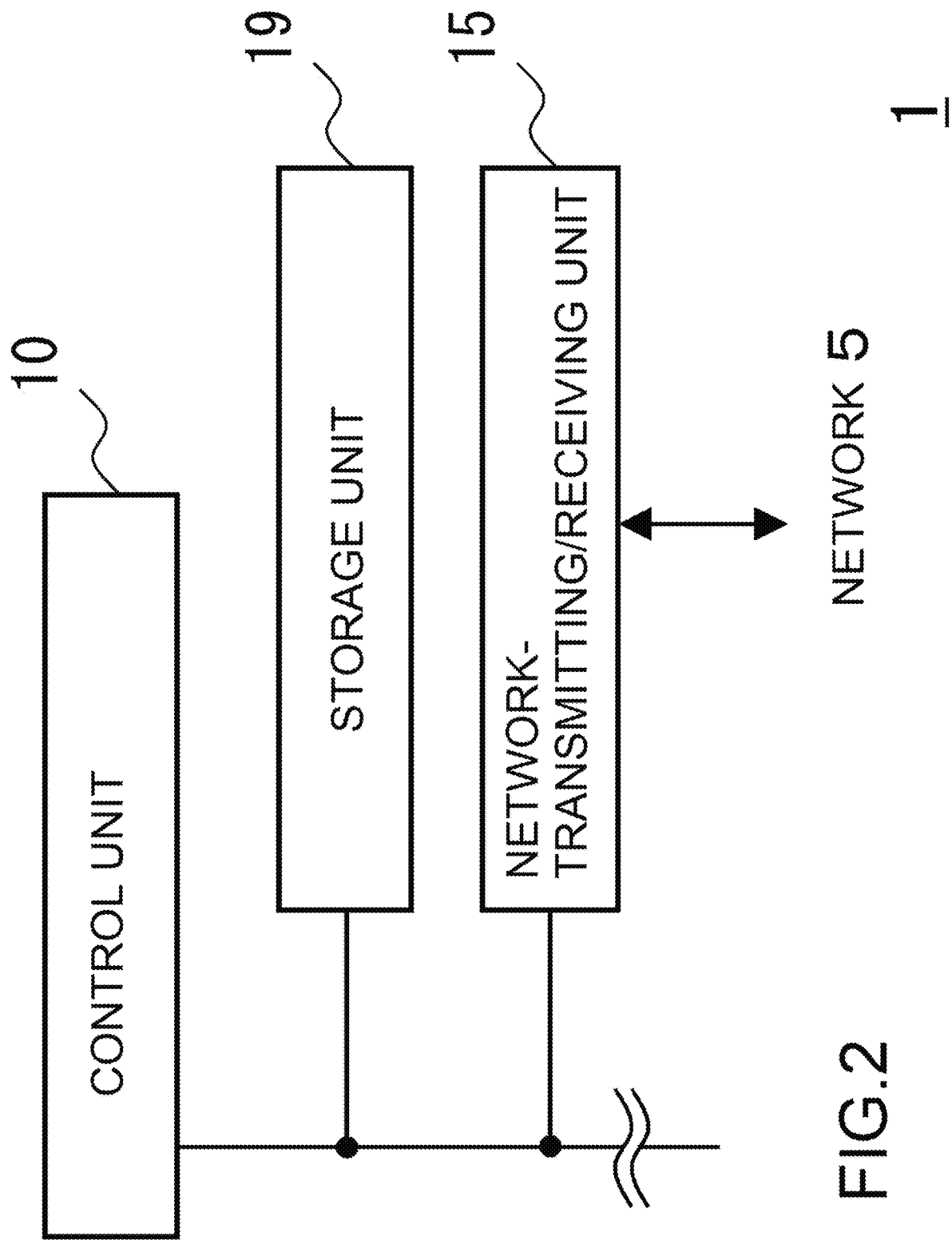
FIG. 2 is a block diagram illustrating control configuration of the server illustrated in FIG. 1.

Next, as illustrated in FIG. 2, the server 1 includes a control unit 10, a network-transmitting/receiving unit 15, and a storage unit 19.

The control unit 10 is an information-processing unit such as a GPP (General Purpose Processor), CPU (Central Processing Unit, central processing apparatus), MPU (Micro Processing Unit), DSP (Digital Signal Processor), GPU (Graphics Processing Unit), ASIC (Application Specific Integrated Circuit, processor for a specified use), and the like.

The control unit 10 operates as each of the units of a functional block described later, by reading a control program that is stored in the ROM, SSD or HDD of the storage unit 19, expanding the control program in the RAM, and executing the control program.

The network-transmitting/receiving unit 15 is a network-connecting unit that includes an LAN board, a wireless-transmitting/receiving apparatus and the like for connecting to the network 5.

The storage unit 19 is a storage unit that uses a non-transitory recording medium. The storage unit 19 may include a RAM (Random Access Memory) or the like as a main storage unit. The storage unit 19 may also include a ROM (Read Only Memory), an eMMC (embedded Multi Media Card), a flash memory such as a SSD (Solid State Drive) or the like, and a HDD and the like as an auxiliary storage unit. In this case, the auxiliary storage unit of the storage unit 19 stores a control program for performing operation control of image forming apparatuses 2.

Moreover, the storage unit 19 may also include, an area for document boxes (folders for saving files, shared folders) for each user. Furthermore, the storage unit 19 may also store information related to the performance and functions of the server 1.

The storage unit 19 may also include an external recording medium such as various kinds of flash memory, an optical recording medium, and the like.

The control unit 10 may have a built-in RAM, ROM, flash memory and the like.

Figure 3:
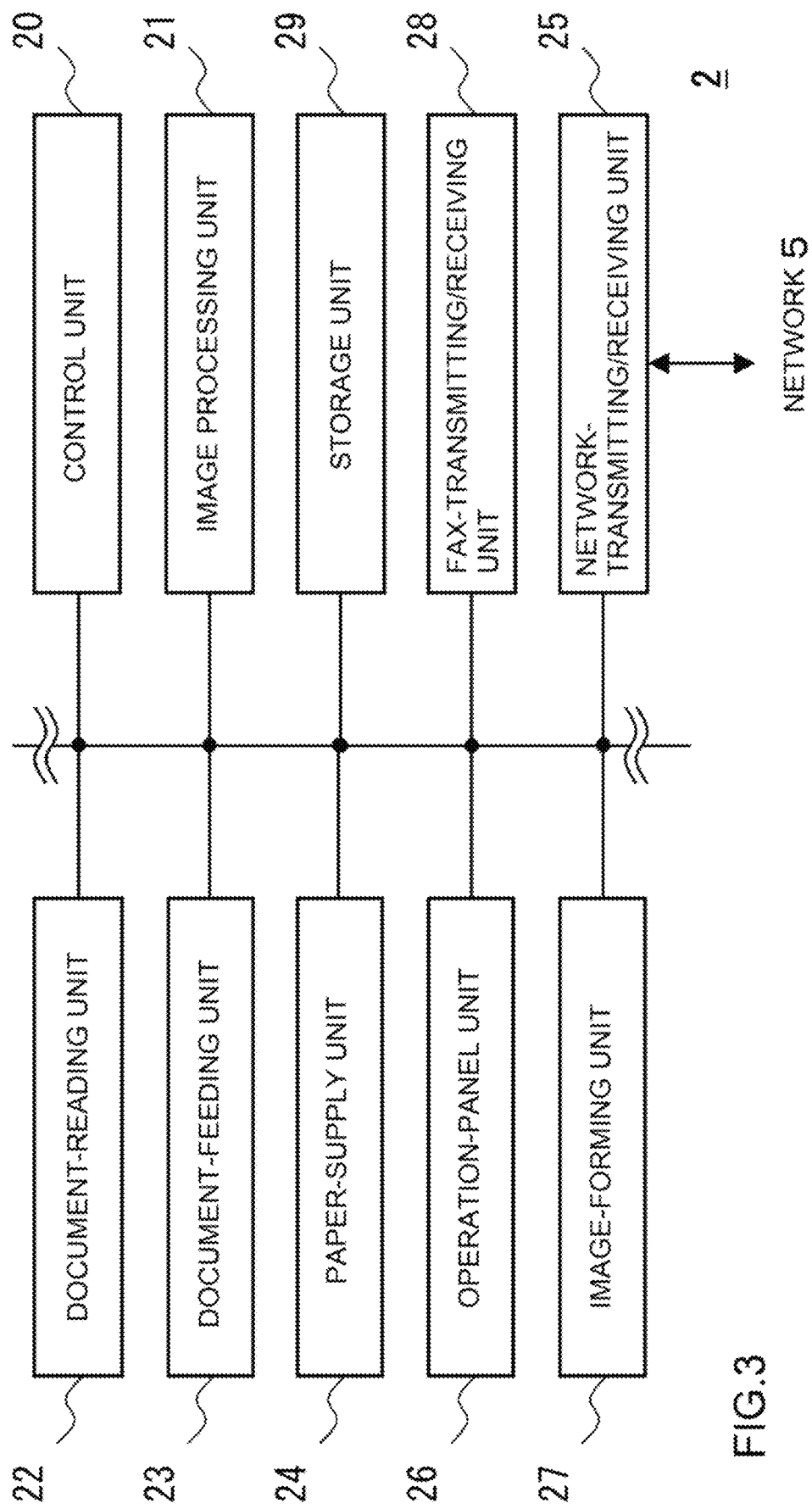
FIG. 3 is a block diagram illustrating control configuration of the image forming apparatus illustrated in FIG. 1.

Next, as illustrated in FIG. 3, an image forming apparatus 2 includes an image-processing unit 21, a document-reading unit 22, a document-feeding unit 23, a paper-supply unit 24, a network-transmitting/receiving unit 25, an operation-panel unit 26, an image-forming unit 27, a FAX-transmitting/receiving unit 28, a storage unit 29 and the like. Each unit is connected to the control unit 20, and the operation is controlled by the control unit 20.

The control unit 20 is an information-processing unit such as a GPP, CPU, MPU, DSP, GPU, ASIC or the like.

The control unit 20 is operated as each of the units of the functional blocks described later by reading a control program that is stored in the auxiliary storage unit of the storage unit 29, expanding the control program in the main storage unit, and executing the control program. Moreover, the control unit 20 performs overall control of the apparatuses according to specified instruction information that is inputted from an external terminal or from the operation-panel unit 26.

The image-processing unit 21 is a control operation unit such as a DSP (Digital Signal Processor), GPU (Graphics Processing Unit) or the like. The image-processing unit 21 is a processing unit that performs specified image processing on image data; for example, performs various image processing such as blank page detection, enlargement, reduction, rotation, density adjustment, tone adjustment, noise reduction, sharpness adjustment, other image improvement, and the like.

The image-processing unit 21 stores images that are read by the image-reading unit 22 in the storage unit 29 as printing data. When doing this, the image-processing unit 21 is also able to convert the printing data in file units having a format such as PDF, TIFF or the like.

Moreover, the image-processing unit 21 may also include an OCR function, an OCR acceleration function and the like. Furthermore, the image-processing unit 21 may include a function for reading barcodes, dot images and the like. In this case, the image-processing unit 21 is also able to output text, figures, graphs, barcodes, dot images and the like that are read in file units.

The document-reading unit 22 is a reading unit that reads (scans) a set document. Moreover, the document-reading unit 22 is arranged on the top of the main unit of an image forming apparatus 2.

The document-reading unit 22 includes a scanner, a platen glass, and a document-reading slit. When reading a document that is placed on the platen glass, the document-reading unit 22 moves the scanner to a position that faces the platen glass, and acquires image data by reading while scanning the document that is placed on the platen glass, then outputs the acquired image data to control unit 20.

Moreover, when a document is fed from the document-feeding unit 23, the document-reading unit 22 moves the scanner to a position that faces the document-reading slit.

Then, the document-reading unit 22 acquires image data by reading the document in synchronization with the conveying operation by the document-feeding unit 23. The document-reading unit 22 then outputs the acquired image data to the control unit 20.

The document-feeding unit 23 is a feeding unit that conveys a document that is read by the document-reading unit 22. The document-feeding unit 23 is arranged on top of the document-reading unit 22.

The document-feeding unit 23 includes a document-placement unit, and a document-conveying mechanism. The document-feeding unit 23 feeds a document that is placed in the document-placement unit in order one sheet at a time by the document-conveying mechanism, and feeds the document to the document-reading unit 22.

The paper-supply unit 24 is a paper-supply unit that feeds printing paper toward the image-forming unit 27 one sheet at a time. The paper-supply unit 24 is included in the main unit.

The network-transmitting/receiving unit 25 is a network-connecting unit that includes an LAN board, a wireless-transmitting/receiving device or the like for connecting to the network 5.

The network-transmitting/receiving unit 25 transmits and receives data by a data communication line, and transmits and receives audio signals by an audio telephone line.

The operation-panel unit 26 includes an input unit such as buttons, a touch panel and the like, and a display unit such as an LCD (Liquid Crystal Display), organic EL display, or the like. Moreover, the operation-panel unit 26 is arranged on the front side of an image forming apparatus 2.

The buttons of the input unit of the operation-panel unit 26 include a numerical keypad, a start button, a cancel button, an operating mode switch, buttons for giving instructions related to executing a job, and the like. The operating mode may include various kinds of modes such as copying, FAX transmission, scanner, network scanner and the like. Moreover, a job may be a type of job such as printing, transmitting, saving, recording and the like of a selected document. The input unit of the operation-panel unit 26 acquires an instruction from a user for various jobs of an image forming apparatus 2. Furthermore, information of each user can be inputted or changed according to a user instruction that is acquired from the operation-panel unit 26.

The image-forming unit 27 is an image-forming unit that, according to a user output instruction, forms an image on printing paper from data that is stored in the storage unit 29, read by the document-reading unit 22, or acquired from an external terminal.

The image-forming unit 27 includes a photosensitive drum, an exposing unit, a developing unit, a transfer unit, a fixing unit and the like. The image-forming unit 27 prints a toner image on printing paper by executing an image-forming process that includes charging, exposing, developing, transferring and fixing.

The FAX-transmitting/receiving unit 28 is a transmitting/receiving unit that performs transmitting and receiving of facsimiles. The FAX-transmitting/receiving unit 28 receives a facsimile from another FAX apparatus by an audio line, saves the facsimile data in the storage unit 29, and causes the image-forming unit 27 to form an image. Moreover, the FAX-transmitting/receiving unit 28 is able to convert a document that is read by the document-reading unit 22, or network FAX data that is transmitted from an external terminal to image data, and transmit a facsimile to another FAX apparatus by an audio line.

The storage unit 29 is a storage unit that uses a non-transitory recording medium such as a semiconductor memory like a ROM (Read Only Memory), RAM (Random Access Memory) and the like, a HDD (Hard Disk Drive) and the like.

The RAM of the storage unit 29 maintains stored contents by a self-refresh function or the like, even when in a power-saving state.

The ROM or HDD of the storage unit 29 stores a control program for performing operation control of an image forming apparatus 2. In addition to this, the storage unit 29 may also store user account settings. Moreover, the storage unit 29 may include an area for document boxes (folders for saving files, shared folders) for each user.

In an image forming apparatus 2, the control unit 20 and the image-processing unit 21 may be integrally formed such as in a CPU with built-in GPU and the like, or as in the case of a chip-on-module package.

Moreover, the control unit 20 and image-processing unit 21 may have built-in RAM, ROM, flash memory and the like.

[Control Configuration of Information Processing System X]

Figure 4:
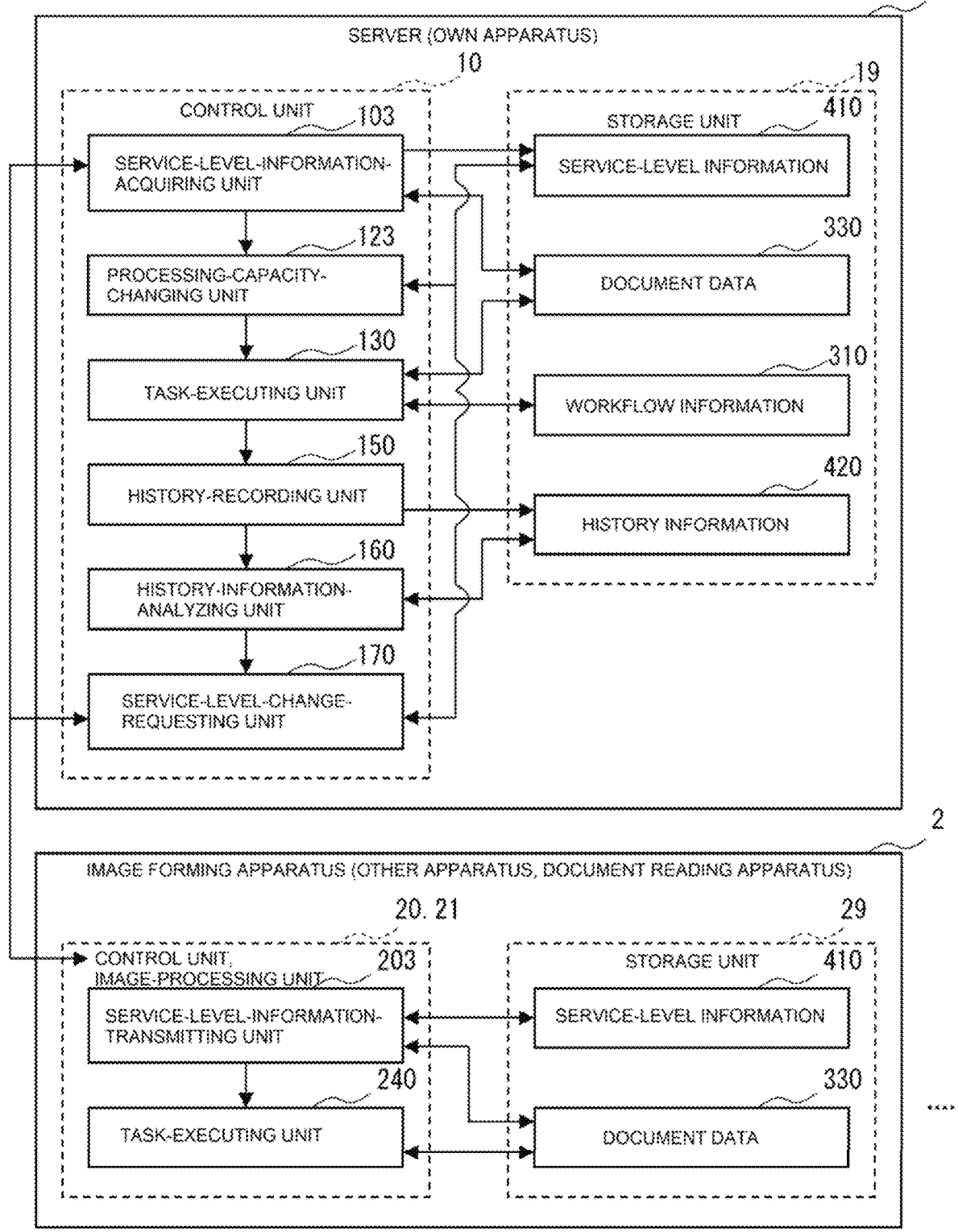
FIG. 4 is a block diagram illustrating the functional configuration of the information processing system illustrated in FIG. 1.

Here, the control configuration of the information processing system X of an embodiment according to the present disclosure will be explained with reference to FIG. 4 and FIG. 5.

In the following, an example will be explained in which a service that perform processing of a workflow of a series of tasks is executed with the server 1 (information processing apparatus) being the "own apparatus", and an image processing apparatus 2 being the "other apparatus" (document reading apparatus).

The control unit 10 of the server 1 includes a service-level-information-acquiring unit 103, a processing-capacity-changing unit 123, a task-executing unit 130, a history-recording unit 150, a history-information-analyzing unit 160, and a service-level-change-requesting unit 170.

The storage unit 19 stores workflow information 310, document data 330 (data of a document), service-level information 410, and history information 420.

The control unit 20 and the image-processing unit 21 of an image forming apparatus 2 includes a service-level-information-transmitting unit 203 and a task-executing unit 240.

The storage unit 29 stores service-level information 410 and document data 330.

The service-level-information-acquiring unit 103 acquires service-level information 410 from an image forming apparatus 2 in customer (customer, tenant) units.

Moreover, in this embodiment, the service-level-information-acquiring unit 103 is able to acquire document data 330 from an image forming apparatus 2, and temporarily store that document data 330 in the storage unit 19. Furthermore, the service-level-information-acquiring unit 103 is also able to acquire output data of each of the tasks of the workflow from an image forming apparatus 2, and temporarily store that output data in the storage unit 19.

The processing-capacity-changing unit 123 changes the degree of processing capacity of the own apparatus in accordance with service-level-information 410 that is acquired by the service-level-information-acquiring unit 103. Moreover, the processing-capacity-changing unit 123 changes the degree of processing capacity by changing the allocated number of execution units of the task-executing unit 130 that executes tasks within a specified time for executing a series of tasks. In this embodiment, as will described later, when "normal service" that is the level of service for providing normal service is set, the processing-capacity-changing unit 123 allows processing of the workflow to be executed by allocating the core number of execution units set for a normal customer. On the other hand, when "premium service" is set as a level of service for providing service of a higher function than normally provided by the server 1 is set, the processing-capacity-changing unit 123 performs processing by increasing the core number of execution units.

Moreover, when it is found in the analysis results of the history information 420 that is analyzed by the history-information-analyzing unit 160 that a specified period of time in which the frequency of executing a service is increased by an amount equal to or greater than a specified threshold value over other periods, the processing-capacity-changing unit 123 may increase the number of allocated execution units of the task-executing unit 130 in that specified period. In this embodiment, as will be explained later, for example, for a customer for which processing of the workflow is executed often at the end of the month or the like, the processing-capacity-changing unit 123 executes processing by allocating a core number of execution units that is larger than the normal core number of execution units during a specified period at the end of the month, or the like. Moreover, when doing this, the processing-capacity-changing unit 123 may increase the allocated number of execution unit in accordance with the service-level information 410. More specifically, in this embodiment, the processing-capacity-changing unit 123 may allocated a larger core number for the "premium service" than the "normal service" even during the specified period.

The task-executing unit 130 includes plural execution units, and causes each of the allocated execution units to execute each of the tasks of a workflow for document data 330 that is read by the image forming apparatus 2. The larger the number of allocated execution units is, the more possible it is to efficiently process a workflow from plural image forming apparatuses 2 in a short amount of time. Moreover, the larger the number of allocated execution units is, the shorter the total execution time for execution all of the tasks of a workflow from one image forming apparatus 2 becomes.

Furthermore, the task-executing unit 130 processes a workflow of a series of tasks by acquiring the output data for each task that has been executed by the server 1 and image forming apparatuses 2 and delivering that output data as input data for the next task.

The history-recording unit 150 records history information 420 of the execution by a service server 1 in customer units.

In this embodiment, the history-recording unit 150 records the history of service for executing a workflow that is set in workflow information 310 in the history information 420.

The history-information-analysis unit 160 analyzes history information 420 that is recorded by the history-recording unit 150.

In this embodiment, the history-information-analysis unit 160, in the history information 420, analyzes the service execution status from a specified customer for the period and contents. This analysis may also be performed using statistical analysis and artificial intelligence-like analysis.

The service-level-change-requesting unit 170 requests the customer to change the level of service in accordance with the analysis results of the history information 420 analyzed by the history-information-analysis unit 160.

When doing this, in this embodiment, when the allocated number of execution units of the task-executing unit 130 in the specified period is increased by the processing-capacity unit, the service-level-change-requesting unit 170 requests the customer to change the service level. In other words, in this embodiment, the service-level-change-requesting unit 170 may request a customer having "normal service" to change to "premium service". On the other hand, it is also possible for the service-level-change-requesting unit 170 to request a customer having "premium service" to change to "normal service".

The service-level-information-transmitting unit 203 transmits service-level information 410 that indicates the level of service for a service that causes the workflow set in the workflow information 310 to be executed by the server 1 for document data 330 that is read by the image forming apparatus 2. In order to do this, service-level-information-transmitting unit 203 transmits the service-level information 410 to the server 1 in accordance with a request from the server 1.

Moreover, the service-level-information-transmitting unit 203 is also able to transmit document data 330 that is stored in the storage unit 29 to the server 1.

The task-executing unit 240 executes tasks that have been determined for execution by the image forming apparatus 2. The task-executing unit 240 may have less execution units than the server 1.

Figure 5:
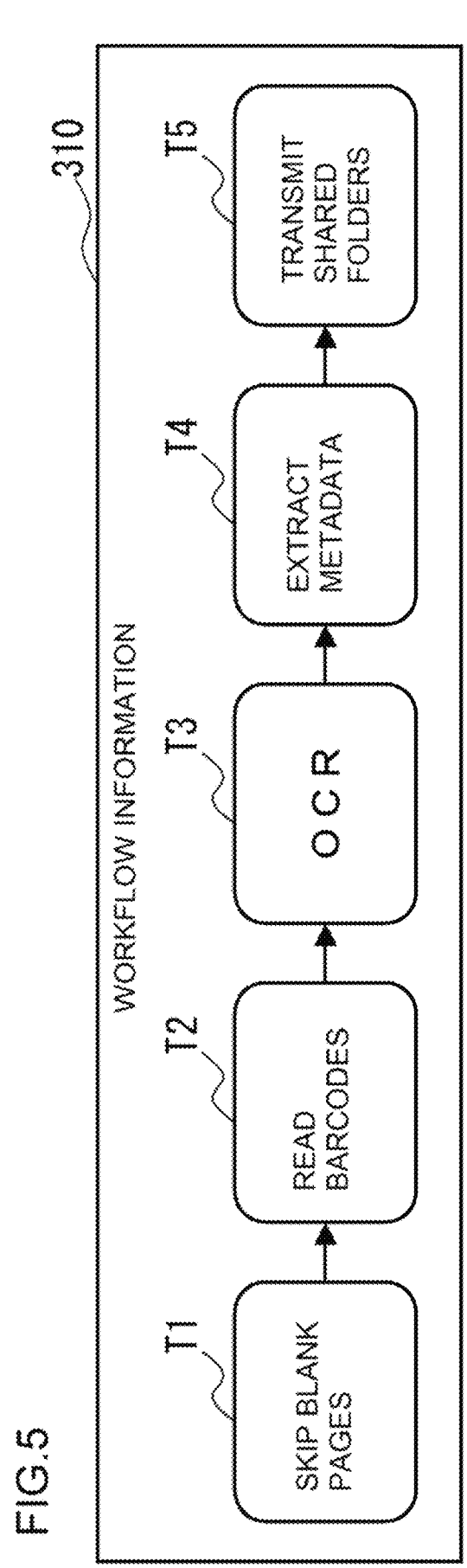
FIG. 5 is a concept diagram of the workflow information illustrated in FIG. 4.

According to FIG. 5, the workflow information 310 is information that includes settings for the flow of processing for a "workflow" of a series of tasks that a user instructs to be executed. When this workflow, for example, is a scanning workflow related to the capture of a document, the workflow includes tasks for image processing, OCR processing, classification processing, transmission processing. Therefore, the workflow information 310 includes settings for the type of each process, the order of processing, parameters for each task and the like. The workflow information 310, for example, includes a description of these settings in a format such a "macro" or a script.

More specifically, for image processing, the workflow information 310 may include task information related to the execution of processes such as skipping blank pages, page sharing, deskewing (automatic skew correction), border removal, contrast adjustment, noise reduction and the like.

Moreover, for OCR processing, the workflow information 310, may include, for example, task information related to the language for character recognition, resolution, whether or not to recognize handwritten characters, execution of recognition of tables and figures, and the like. Furthermore, the workflow information 310 may include information such as the version of the OCR recognition engine, the recognition speed and the like. As OCR processing, the workflow information 310, may also include task information related to the recognition of barcodes having property of one dimension, two dimensions, and/or color, dot images and the like. Moreover, for classification processing, the workflow information 310 may include, for example, task information for executing classification of invoices, billing, accounts and the like, acquiring items, extracting metadata and the like. Of these, as metadata, the workflow information 310 may include information for a customer ID (identification), company name, name, amount of items, tax and the like.

Furthermore, for transmission processing, the workflow information 310 may include, for example, task information for transmission processing by e-mail, transmission processing to document boxes (folders for saving files, shared folders), and transmission processing to a DMS. When doing this, the workflow information 310 may include the e-mail addresses of users or groups, addresses of document boxes, or the application name, address, account ID and the like of a DMS.

The workflow information 310 can be set in customer units by an administrator of the image forming apparatus 2, or an administrator of the server 1 or the like using an application or from the server 1.

The document data 330 is data that is the target of the various processing in the workflow. In this embodiment, an example will be described in which the document data 330 is image data of a document that is read by the document-reading unit 22 of an image forming apparatus 2. This image data may be, for example, bitmap data such as BMP or the like, compressed bitmap data such as TIFF, jpg and the like, PDF (Portable Document Format) data and the like. Moreover, the document data 330 may be a collection of image data in page units, or may be data to which various character data or intermediate data are added in accordance with the degree of progress of the processing of each task described above. The document data 330 may also be a collection of plural files instead of a single file. Moreover, the document data 330 may be PDF data or the like that is saved beforehand in a document box of a user of an image forming apparatus 2 or the server 1, or that is acquired from a terminal or the like.

The service-level information 410 is information that indicates the level of service for service that causes a workflow of a series of task that is set in the workflow information 310 to be executed by the server 1. In other words, the level of service for each customer is set in the service-level information 410.

Moreover, in this embodiment, an example is described in which the service-level information 410 includes information that indicates the customer ID (identification), and the level of service: "normal service" or "premium service". More specifically, in this embodiment, "normal service" is a level of service that is received when a customer performs normal charging or the like. Moreover, "premium service" is a level of service that is received when a customer performs a higher degree of charging or the like than in "normal service".

As "premium service", a plurality of levels of service may be set according to the degree of charging or the like. Moreover, as a "test" level, a level of service may be set that is received when charging is less than in "normal service" or when there is no charging. Furthermore, "no service" may be set as a level of service when no service is received.

The service-level information 410 may include, for example, information that indicates to what degree and how it is desired that the server 1 execute functions corresponding to each process in a workflow such as image processing, OCR processing, classification processing, and transmission processing.

Moreover, as service-level information 410, information regarding the hardware state of each image forming apparatus 2 of a customer, the difference in firmware versions, whether or not applications are installed, state of license authorization and the like may be included. In other words, it is possible to include information regarding whether or not the model of image forming apparatus 2 itself has a certain function.

Furthermore, the service-level information 410 may also include a language setting, model name, serial number, installation location, customer information and other information for each image forming apparatus 2 of the customer.

The history information 420 is information that indicates the history of execution of service by the server 1. The history information 420 in this embodiment may include information in log format of the type of workflow, the time service was executed, the amount of time that execution required, the load on the server 1 due to execution of a service, the performance, installation location and the like of the image forming apparatus 2 that executed a service. Moreover, as the load on the server 1, it is possible to include values such as the number of pages included in the document data 330, the efficiency of OCR processing, load of data transmission, number of bytes transmitted and the like.

Here, the control unit 10 of the server 1 functions as the service-level-information-acquiring unit 103, the processing-capacity-changing unit 123, the task-executing unit 130, the history-recording unit 150, the history-information-analyzing unit 160 and service-level-change-requesting unit 170 by executing a control program that is stored in the storage unit 19.

Moreover, the control unit 20 of an image forming apparatus 2 functions as the service-level-information-transmitting unit 203 and the task-executing unit 240 by executing a control program that is stored in the storage unit 29.

Furthermore, each of the units of the server 1 and image forming apparatus 2 described above is a hardware resource for executing the image forming method according to the present disclosure.

[Service Execution Process by the Information Processing System X]

Figure 6:
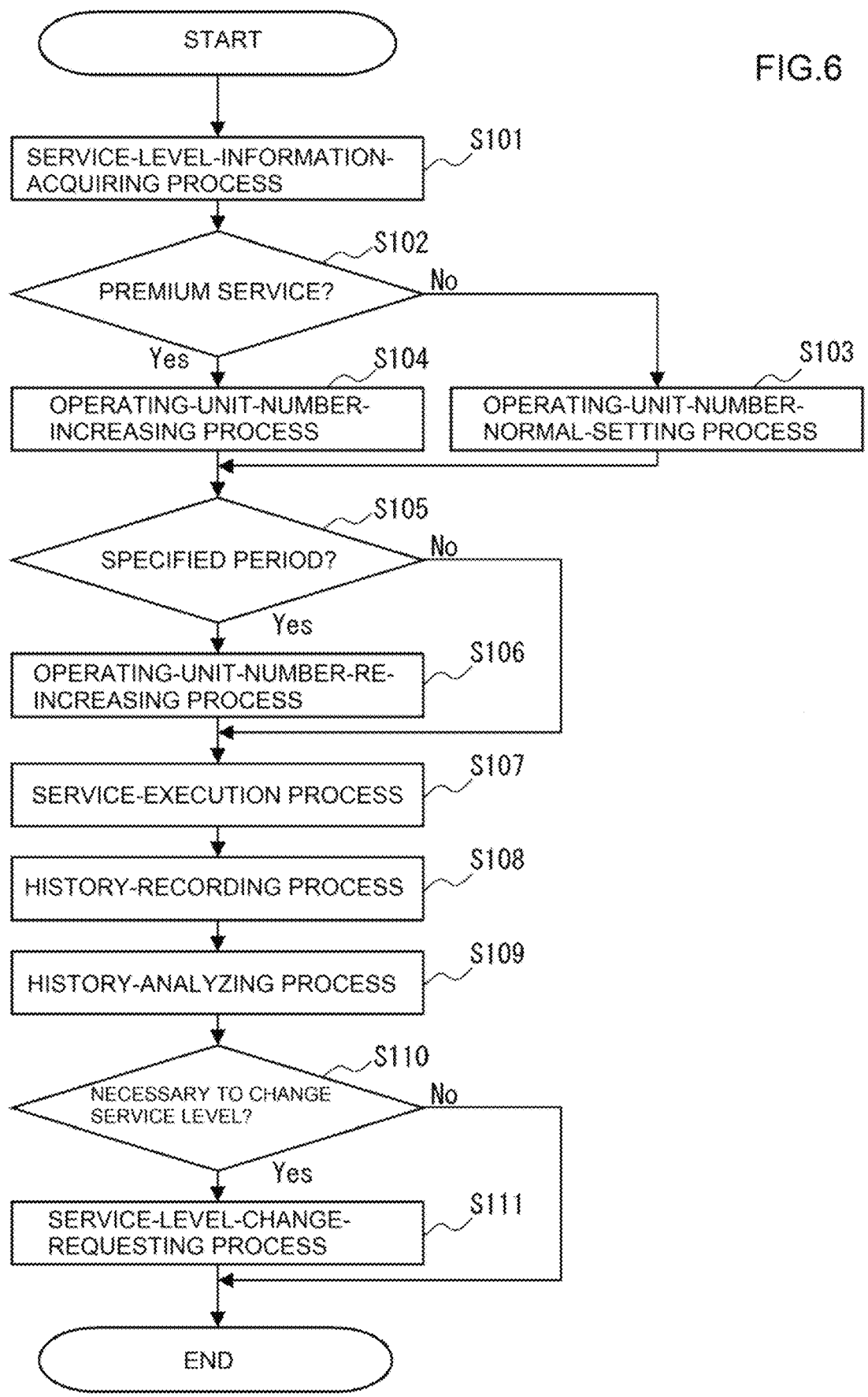
FIG. 6 is a flowchart of a service-execution process of an embodiment according to the present disclosure.

Next, the service execution process by the information processing system X of an embodiment according to the present disclosure will be explained with reference to FIG. 6 to FIG. 8.

In the service execution process of this embodiment, the server 1 acquires service-level information 410 from the image forming apparatus 2. Then, the server 1 changes the degree of processing capacity by the server 1 in accordance with the acquired service-level information 410. When doing this, the degree of processing capacity is changed by changing the allocated number of execution units of the task-executing unit 130 that will execute tasks within a specified time. Moreover, the server 1 records in customer units history information 420 of the execution of service by the server 1. When doing this, the server 1 analyzes the recording history information 420. Furthermore, in the analysis results of the analyzed history information 420, when a specified period is found during which the frequency of executing a service increases, the server 1 increases the allocated number of execution units of the task-executing unit 130 in that specified period period in accordance with the service-level information 410. Moreover, the server 1 requests the customer to change the level of service in accordance with the analysis results.

In the service execution process of this embodiment, mainly the control unit 10 executes a program that is stored in the storage unit 19, and the control unit 20 and image-processing unit 21 execute a program stored in the storage unit 29, with each of the units working in cooperation, and by using the hardware resources.

The service execution process will be explained in detail below for each step with reference to the flowchart in FIG. 6.

(Step S101)

First, the service-level-information transmitting unit 203 of the image forming apparatus 2 and the service-level-information-acquiring unit 103 of the server 1 perform a service-level-information-acquiring process.

Here, when a user instruction for executing a workflow is acquired from the operation-panel unit 26 of the image forming apparatus 2 or from a terminal, an execution command to execute the workflow is transmitted to the server 1.

Moreover, when performing a capture by the image forming apparatus 2, the document-reading unit 22 captures the document, and stores the captured data temporarily in the storage unit 29 as document data 330 of bitmap data. This capturing of a document may also be performed in parallel with execution of a task explained below.

The service-level-information-acquiring unit 103 of the server 1 acquires the execution command for executing the workflow, and then instructs the service-level-information-transmitting unit 203 of the image forming apparatus 2 to transmit service-level information 410.

After acquiring this instruction, the service-level-information-transmitting unit 203 of the image forming apparatus 2 transmits the service-level information 410 that is stored in the storage unit 29 to the server 1.

The service-level-information-acquiring unit 103 of the server 1 acquires the service-level information 410 that is transmitted from the service-level-information-transmitting unit 203 of the image forming apparatus 2, and stores that service-level information 410 in the storage unit 19.

(Step S102)

Next, the processing-capacity-changing unit 123 determines whether or not the service level is "premium service". The processing-capacity-changing unit 123 references the acquired service-level information 410, and when "premium service" of this embodiment is set, determines YES. When the service is something other than this, or in other words, in this embodiment, when "normal service" is set, the processing-capacity-changing unit 123 determines NO.

In the case of YES, the processing-capacity-changing unit 123 advances the process to step S104.

In the case of NO, the processing-capacity-changing unit 123 advances the process to step S103.

(Step S103)

When the service-level information 410 indicates "normal service", the processing-capacity-changing unit 123 performs an operating-unit-number-normal-setting process. The processing-capacity-changing unit 123 sets the degree of processing capacity by the own apparatus to a level that is received when a customer performs normal charging and the like.

Figure 7:
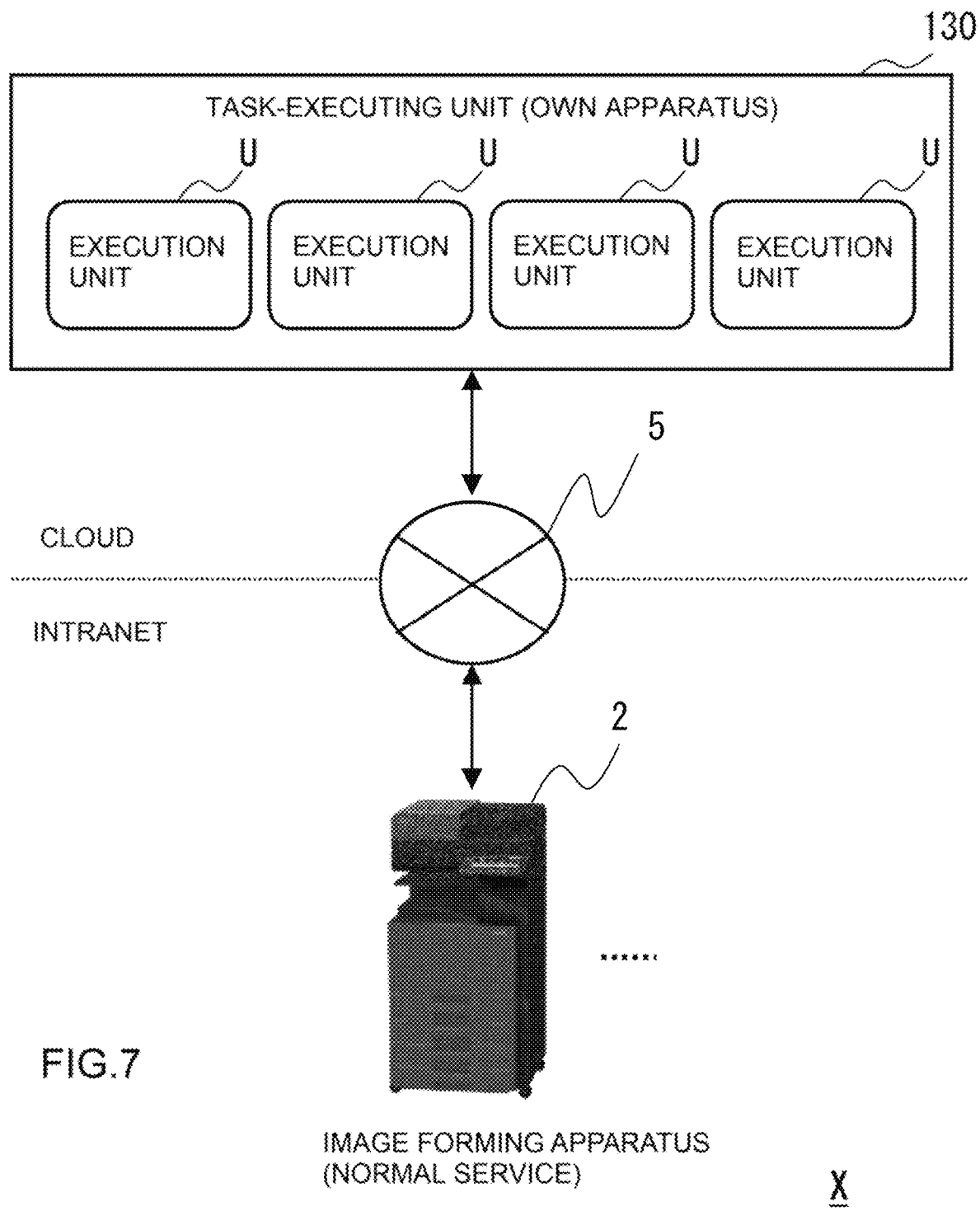
FIG. 7 is a concept diagram of an example of allocation of execution units in the service-execution process illustrated in FIG. 6.

According to the example in FIG. 7, the processing-capacity-changing unit 123 changes the degree of processing capacity by the server 1 to the setting for "normal service". The processing-capacity-changing unit 123, for example, allocates four execution units U of the task-executing unit 130 for executing each of the tasks of the workflow. This allocation may be just for a specified period, or in other words, just for the period for executing each of the tasks in the workflow information 310.

After that, the processing-capacity-changing unit 123 advances the process to step S105.

(Step S104)

When the service-level information 410 indicates "premium service", the processing-capacity-changing unit 123 performs an operating-unit-number-increasing process. The processing-capacity-changing unit 123 sets the degree of processing capacity by the own apparatus to a level that is received when the customer performs more charging or the like.

Figure 8:
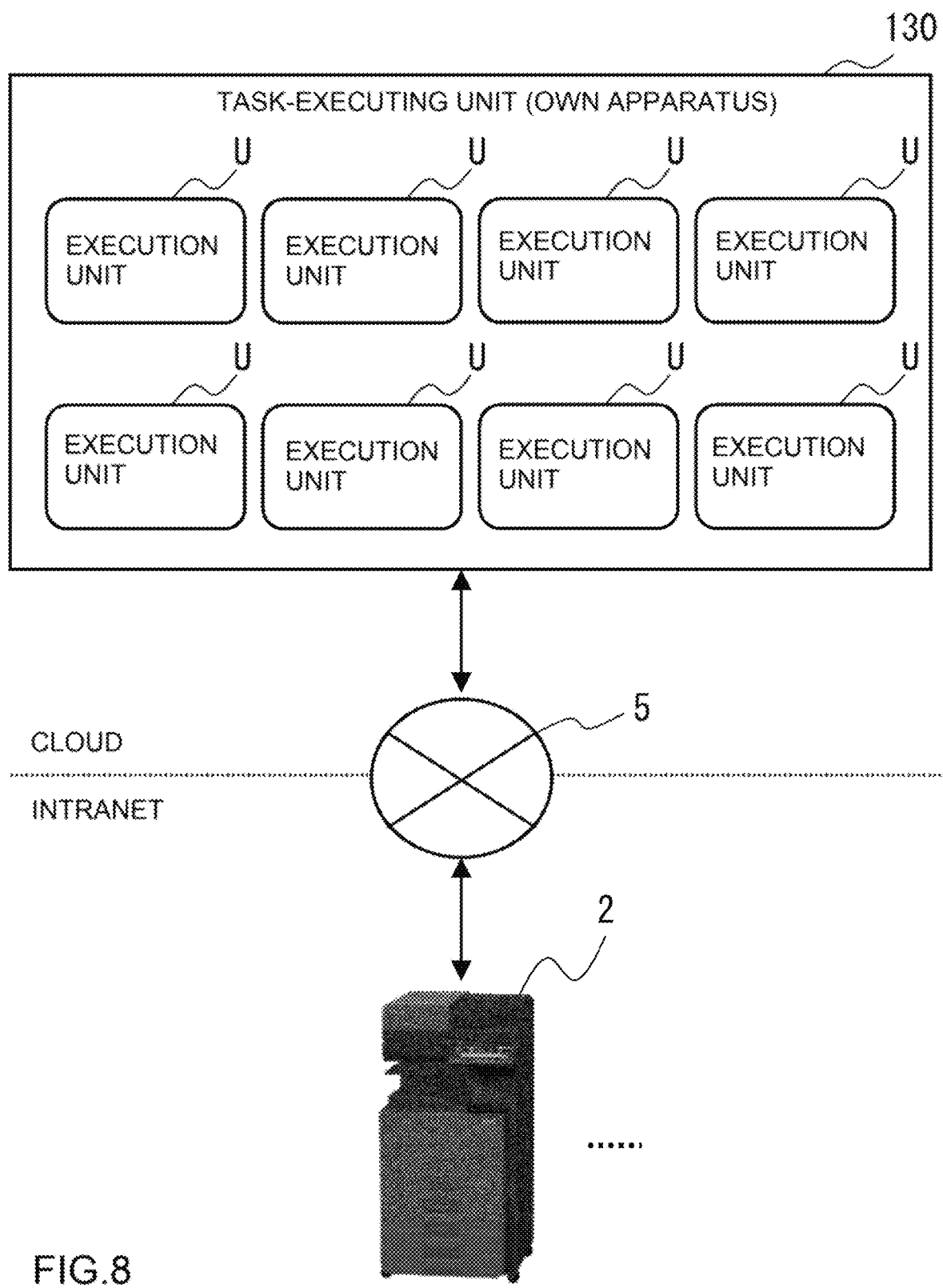
FIG. 8 is a concept diagram of an example of allocation of execution units in the service-execution process illustrated in FIG. 6.

According to the example in FIG. 8, the processing-capacity-changing unit 123, for example, allocates a larger number of execution units of the task-executing unit 130 for executing the tasks of the workflow than in "normal service". In the example in FIG. 8, the processing-capacity-changing unit 123 allocates eight execution units U, or double the number as in the "normal service". This allocation as well may be just for a specified period, or in other words, just for the period for executing the tasks in the workflow information 310.

(Step S105)

Next, the processing-capacity-changing unit 123 determines whether or not the time is in a specified period. A specified period during which a large frequency of executing customer service is found beforehand from the analysis results of analysis performed by the history-information-analyzing unit 160, and when the time of executing the service is within this specified period, the processing-capacity-changing unit determines YES. When the time is not within this period, the processing-capacity-changing unit 123 determines NO.

In the case of YES, the processing-capacity-changing unit 123 advances the process to step S106.

In the case of NO, the processing-capacity-changing unit 123 advances the process to step S107.

(Step S106)

When the time is within the specified period, the processing-capacity-changing unit 123 performs an operating-unit-number-re-increasing process.

The processing-capacity-changing unit 123 increases the allocated number of execution units of the task-executing unit 130 in the specified period in accordance with the service-level information 410. This increase in the allocated number may also be just for a specified time, or in other words, just for the time for executing the tasks in the workflow information 310.

More specifically, the processing-capacity-changing unit 123, for example, further increases the allocated number of execution units for the workflow of the service that is executed by the task-executing unit 130. Moreover, when "premium service" is set in the service-level information 410, the processing-capacity-changing unit 123 may increase the number of execution units to be increased more than when "normal service" is set.

In the examples in FIG. 7 and FIG. 8, the processing-capacity-changing unit 123 may also, for example, allocate twelve execution units for "premium service" and six execution units for "normal service".

(Step S107)

Next, the task-executing unit 130 performs a service-execution process.

The task-executing unit 130 executes each of the tasks in specified workflow information 310 for the document data 330. When doing this, the task-executing unit 130 may also execute tasks that cannot be executed by the image forming apparatus 2.

As a result, the document data 330 is processed, and is exchanged as input data and output data among each of the image forming apparatuses 2 and/or server 1. When doing this, the task-executing unit 240 and/or task-executing unit 130 may acquire the output data that is the result of executing each of the tasks, and deliver that output data as input data for the next task. As a result, the task-executing unit 240 and/or task-executing 130 process each of the tasks as a workflow of a series of tasks. The task-executing unit 240 and/or task-executing unit 130 may create temporary files of this input data and output data, transmit and receive the files, and may transmit and receive data in specified units such as pages of the document data 330.

Moreover, the task-executing unit 130 may, according to the service-level information 410, cause tasks that are not installed in the image forming apparatus 2 or for which the execution speed is slower than the server 1 to be executed by the server 1. More specifically, when an image forming apparatus 2 does not have a function capable of executing the task related for example to image processing, OCR processing and transmission processing, or when the image forming apparatus 2 has that function, but is not able to use the function, the task-executing unit 130 executes the task by the own apparatus. Moreover, the task-executing unit 130 executes the task by the own apparatus when, according to the extent of the processing capacity, transmitting and receiving speed, performance of server 1, and the like, executing the task by the server 1 would result in a better total processing time or higher processing efficiency.

Moreover, the task-executing unit 130 may cause an image forming apparatus 2 to execute tasks that correspond to functions that are installed in the image forming apparatus 2. More specifically, when an image forming apparatus 2 has a function that is capable of executing a task that is related, for example, to image processing, OCR processing and transmission processing, and is able to use that function, the task-executing unit 130 is able to cause the other apparatus to execute the task.

When an image forming apparatus 2 has a function that is capable of executing the task, but is not able to use that function, the task-executing unit 130 may temporarily allow use of that function, and may cause the image forming apparatus 2 to execute the task. In other words, the task-executing unit 130 may give temporary license for the application of the image forming apparatus 2 that corresponds to that function, or temporarily install the application itself, so that the function can be used. After that, when it has become possible to use the function, the task-executing unit 130 may cause the image forming apparatus 2 to execute the task.

(Step S108)

Next, the history-recording unit 150 performs a history-recording process.

The history-recording unit 150 adds the history of the execution of a service to the history information 420, and stores the history information. When doing this, the history-recording unit 150 may store the history information 420 in customer units and/or in service units.

(Step S109)

Next, the history-information-analyzing unit 160 performs a history-analyzing process.

The history-information-analyzing unit 160 analyzes the executing status of service from a specified customer for the period and contents. The history-information-analyzing unit 160 may perform this analysis by using statistical analysis, or artificial intelligence-like analysis.

The history-information-analyzing unit 160 finds, for example, a specified period during which the frequency of executing a service for a specified customer increases more than a threshold value over other periods.

Moreover, when this specified period is set, the history-information-analyzing unit 160 also analyzes whether or not the operating-unit-number-re-increasing process of step S106 has actually been executed during this specified period.

(Step S110)

Next, the service-level-change-requesting unit 170 determines whether or not it is necessary to change the service level. When a specified period is found from the analysis results of the history information 420 that is analyzed by the history-information-analyzing unit 160, the service-level-change-requesting unit 170 determines YES. Moreover, even when "normal service" is set in the service-level information 410, and the operating-unit-number-re-increasing process is executed during the specified period, the service-level-change-requesting unit 170 determines YES. In other cases, the service-level-change-requesting unit 170 determines NO.

In the case of YES, the service-level-change-requesting unit 170 advances the process to step S111.

In the case of NO, the service-level-change-requesting unit 170 ends the service-execution process.

(Step S111)

When it is necessary to change the service level, the service-level-change-requesting unit 170 performs a service-level-change-requesting process.

For example, the service-level-change-requesting unit 170 transmits a message "Use the 'premium service' when it is desired to improve the efficiency of the service processing speed" or the like by e-mail, messenger, or the like. When doing this, the server-level-change-requesting unit 170 may calculate the change or the like in the approximate processing time in the case when the allocated number of execution units is increased when changing to premium service, and that may be described in this e-mail or the like.

This ends the service execution process of an embodiment according to the present disclosure.

By using configuration as described above, it is possible to obtain the effects below.

In typical technology, it is not possible to change the execution efficiency of this service in accordance with the status of customer charges or the like.

However, the information processing system X of an embodiment according to the present disclosure includes an image forming apparatus 2 that is a document reading apparatus, and a server 1 that is an information processing apparatus that is capable of transmitting and receiving data to and from the image forming apparatus 2 via a network 5. Moreover, the image forming apparatus 2 includes a service-level-information-transmitting unit 203. The service-level-information-transmitting unit 203 transmits service-level information 410 that indicates the level of service for a service that causes a workflow of a series of tasks that is set in workflow information 310 for document data 330 that is read by the image forming apparatus 2 to be executed by the server 1. Moreover, the server 1 includes a service-level-information-acquiring unit 103 and a processing-capacity-changing unit 123. The service-level-information-acquiring unit 103 acquires service-level information 410 from the image forming apparatus 2. The processing-capacity-changing unit 123 changes the degree of processing capacity of its own apparatus in accordance with the service-level information 410 that is acquired by the service-level-information-acquiring unit 103. The processing-capacity-changing unit 123 changes the degree of processing capacity by changing the number of allocated execution units of a task-executing unit that executes the task within a specified time the series of tasks will be executed.

By using this kind of configuration that makes it possible to change the number of execution units that execute tasks in service by the server 1 according to a customer, it is possible to change the efficiency of executing tasks for a specified customer. For example, depending on the charging status, it becomes possible to provide a "premium service" that is capable of using eight execution units, and a "normal service" that is capable of using four execution units.

Moreover, the server 1 of an embodiment according to the present disclosure further includes a history-recording unit 150, a history-information-analyzing unit 160, and a service-level-change-requesting unit 170; and the level of service for each customer is set in the service level information 410. The history-recording unit 150 records history information 420 of execution of service by its own apparatus in units of customers. The history-information-analyzing unit 160 analyzes the history information 420 that is recorded by the history-recording unit 150. The service-level-change-requesting unit 170 requests the customer to change the level of service in accordance with the analysis results of the history information 420 that is analyzed by the history-information-analyzing unit 160.

By using this kind of configuration, it is possible to request a change in the level of service to correspond to the actual state of usage of the customer. For example, it is possible to request a customer having a large amount of scanning, having a desire to shorten the time to complete processing of a series of tasks, and having an actual high frequency of executing service to switch to "premium service". Moreover, for example, it is possible to request a customer having a small amount of scanning and for which the scanning speed can be lowered, and having an actual low frequency of processing to switch to "normal service".

Moreover, when the processing-capacity unit 123 finds a specified period in the analysis results of the history information 420 that is analyzed by the history-information-analyzing unit 160 during which the frequency of the execution of service increases, the server 1 of an embodiment according to the present invention increases the number of allocated execution units of the task-executing unit during that specified period in accordance with the service-level information 410.

By using this kind of configuration, it is possible to increase the task processing capacity and provide convenience to the user during the specified period during which execution of tasks is frequently performed. Furthermore, the degree of this improvement of the task processing capacity can be changed, for example, between "premium service" and "normal service", and convenience can be provided to the user according to the charging state.

Other Embodiments

In an embodiment according to the present disclosure, the server 1 was described as being a single information processing apparatus. However, the server 1 may also be a collection of plural servers. Moreover, these plural servers may be separated and connected by a network. Furthermore, the execution units of the task-executing unit 130 may separately exist in these plural servers. The processing speed, processing efficiency and the like of the respective execution units of these plural servers may be different. Moreover, these execution units may be the "physical" core as a control operation unit of an actual CPU, or maybe the logic core of multithreading and the like. Furthermore, each execution unit, for example may be a unit that specializes in OCR processing or transmission processing, or may be a unit that performs with high efficiency. Moreover, the server 1 itself may include in addition to the control unit 10, a control-operation unit for executing OCR processing, classification processing and the like at high speed, and these may also be used as execution units. This control-operation unit may be an ASIC, a DSP, and external accelerator, or the like for executing specific operations of an artificial neural network or the like at high speed.

Furthermore, in this kind of configuration, as change in the degree of processing capacity in the level of service, when, for example, the level of service is high such as "premium service", execution units that higher performance than in "normal service" may be preferentially allocated. Moreover, configuration may be such that the degree of processing capacity is changed by changing between "premium service" and "normal service" at a "specified time" for changing the number of allocated execution units.

By using this kind of configuration, it becomes possible to provide service that further meets the needs of a user.

Moreover, in the embodiment above, the server 1 was described as the "own apparatus" and the image forming apparatus 2 was described as the "other apparatus", however, the embodiment is not limited to this. In other words, configuration may be such that service-level information 410 is acquired with the image forming apparatus 2 being the "own apparatus" and the sever 1 being the "other apparatus", and such that the image forming apparatus 2 shares tasks.

By using this kind of configuration, it becomes possible to flexibly share tasks and perform processing efficiently.

Furthermore, the present disclosure can be also applied to a document reading apparatus other than an image forming apparatus 2. Moreover, configuration may also be such that a network 5 is not used, and the document reading apparatus and information processing apparatus are directly connected. In other words, configuration may be such that a server or the like to which a network scanner or scanner are separately connected by USB or the like is used.

By using this kind of configuration, it becomes possible to provide service that corresponds to the level of service for each customer even for a document reading apparatus other than an image forming apparatus.

Moreover, in the embodiment above, sharing each of the tasks of a scanning workflow related to capturing a document was described, however, types of workflows other than this can also be handled. Furthermore, it is also possible to share tasks other than for image processing, OCR processing, classification processing and transmission processing.

By using this kind of configuration it is possible to flexibly provide service.

The typical technology described above is technology for efficiently executing jobs by a single image forming apparatus.

Therefore, in an image processing apparatus that provides service for executing a series of tasks (workflow) from plural image forming apparatuses, it is not possible to handle a technical request for changing the execution efficiency of executing tasks in accordance with the status of customer charging or the like.

With the technology according to the present disclosure, it is possible to provide an information processing apparatus that is capable of changing the execution efficiency for executing tasks for a specified customer by changing the number of allocated execution units that execute tasks within a specified time, and changing the degree of processing capacity by the own apparatus in accordance with service-level information.

The configuration and operation of the embodiments described above are examples, and needless to say appropriate changes can be executed within a range that does not depart from the spirit and scope of the present disclosure.

What is claimed is:

1. An image processing apparatus that is capable of transmitting and receiving data to and from a document reading apparatus, comprising a controller and a storage unit comprising a non-transitory recording medium having a control program stored thereon, wherein the controller reads the control program to operate as:
- a service-level-information-acquiring unit that acquires service-level information that indicates a level of service for a service that executes a workflow, which is a series of tasks including at least OCR processing for data of a document that is read by the document reading apparatus by an own apparatus, wherein the service-level-information-acquiring unit can acquire the level of service as a normal service and can acquire the level of service as a premium service;
- a processing-capacity-changing unit that changes a degree of processing capacity by the own apparatus in correspondence with the service-level information that is acquired by the service-level-information-acquiring unit; and
- a task-executing unit that executes the tasks within a specified time; wherein
- the processing-capacity-changing unit changes the degree of the processing capacity by changing a number of allocated execution units of the task-executing unit,
- the processing-capacity-changing unit allocates a larger number of allocated execution units for the premium service relative to the normal service; and
- increasing the number of allocated execution units reduces total time for execution of the series of tasks of the workflow.

2. The information processing apparatus according to claim 1, wherein
- a level of service for each customer is set in the service-level information; and
- said reading of the control program further causes the controller to operate as:
- a history-recording unit that records history information of execution of the service by the own apparatus in units of the customers;
- a history-information-analyzing unit that analyzes the history information that is recorded by the history-recording unit; and
- a service-level-change-requesting unit that requests the customer to change the level of service in accordance with the analysis results of the history information that is analyzed by the history-information-analyzing unit.

3. The information processing apparatus according to claim 2, wherein
- when a specific period during which the frequency of executing the service increases is found in the analysis results of the history information that is analyzed by the history-information-analyzing unit,
- the processing-capacity-changing unit increases the number of allocated execution units of the task-executing unit during that specified period in accordance with the service-level information.

4. An information processing system that includes a document reading apparatus and an information processing apparatus that is capable of transmitting and receiving data to and from that document reading apparatus; wherein
- the document reading apparatus comprises a first controller and a storage unit comprising a non-transitory recording medium having a first control program stored thereon, wherein the first controller reads the first control program to operate as:
- a service-level-information-transmitting unit that transmits service-level information that indicates a level of service for service that causes a workflow, which is a series of tasks including at least OCR processing for data of a document that is read by the document reading apparatus, to be executed by the information processing apparatus, wherein the service-level-information-acquiring unit can acquire the level of service as a normal service and can acquire the level of service as a premium service; and
- the information processing apparatus comprises a second controller and a storage unit comprising a non-transitory recording medium having a second control program stored thereon, wherein the second controller reads the second control program to operate as:
- a service-level-information-acquiring unit that acquires the service-level information from the document reading apparatus;
- a process-capacity-changing unit that changes the degree of processing capacity by the own apparatus in accordance with the service-level information that is acquired by the service-level-information-acquiring unit; and
- a task-executing unit that executes the tasks within a specified time wherein
- the processing-capacity-changing unit changes the degree of the processing capacity by changing a number of allocated execution units of the task-executing unit;
- the processing-capacity-changing unit allocates a larger number of allocated execution units for the premium service relative to the normal service; and
- increasing the number of allocated execution units reduces total time for execution of the series of tasks of the workflow.

5. An information processing method that is executed by an information processing apparatus that is capable of transmitting and receiving data to and from a document reading apparatus, and causes the information processing apparatus to:
- acquire service-level information that indicates a level of service for a service that executes a workflow, which is a series of tasks including at least OCR processing for data of a document that is read by the document reading apparatus by an own apparatus, wherein the acquired level of service can independently be a normal service level and a premium service level;
- change the degree of processing capacity by the own apparatus in accordance with the acquired service-level information; and
- change the degree of the processing capacity by changing a number of allocated execution units of a task-executing unit that executes the tasks within a specified time,
- wherein a larger number of allocated execution units is allocated for the premium service level relative to the normal service level; and
- wherein increasing the number of allocated execution units reduces total time for execution of the series of tasks of the workflow.

* * * * *